US009525800B2

United States Patent
Horiguchi (10) Patent No.: US 9,525,800 B2
(45) Date of Patent: Dec. 20, 2016

(54) IMAGE FORMING APPARATUS

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/751,360

(22) Filed: Jun. 26, 2015

(65) Prior Publication Data

US 2015/0381854 A1     Dec. 31, 2015

(30) Foreign Application Priority Data

Jun. 30, 2014  (JP) ................................ 2014-134615

(51) Int. Cl.
*H04N 1/46* (2006.01)
*H04N 1/04* (2006.01)
(Continued)

(52) U.S. Cl.
CPC ........ *H04N 1/4076* (2013.01); *H04N 1/00045* (2013.01); *H04N 1/1039* (2013.01);
(Continued)

(58) Field of Classification Search
None
See application file for complete search history.

(56) References Cited

U.S. PATENT DOCUMENTS 4,879,604 A * 11/1989 Koshiyouji .......... H04N 1/1017
                                                    358/474
4,893,196 A *  1/1990 Koshiyouji .......... H04N 1/1017
                                                    358/408
(Continued)

FOREIGN PATENT DOCUMENTS

JP     H10215352 A     8/1998
JP    2002209071 A     7/2002
(Continued)

OTHER PUBLICATIONS

Notice of Reasons for Refusal mailed by Japan Patent Office on Jun. 21, 2016 in the corresponding Japanese patent application No. 2014-134615.

*Primary Examiner* — Madelein Nguyen
(74) *Attorney, Agent, or Firm* — IP Business Solutions, LLC (57) ABSTRACT

A document reading device includes: a document feed section; a contact glass plate on which an original document is fed from the document feed section; a white color reference member beside a front surface of the contact glass plate; a first reading unit beside a back surface of the contact glass plate, configured to read the original document on the front surface of the contact glass plate or the white color reference member; and a positioning member configured to position the white color reference member to be read selectively between a first reading position being the same position as the original document in contact with the front surface of the contact glass plate and a second reading position away from the front surface of the contact glass plate by a document passage clearance allowing the original document to pass between the contact glass plate and the white color reference member.

9 Claims, 9 Drawing Sheets

(51) Int. Cl.
*H04N 1/407* (2006.01)
*H04N 1/10* (2006.01)
*H04N 1/00* (2006.01)
*H04N 1/401* (2006.01)

(52) U.S. Cl.
CPC ......... *H04N 1/1061* (2013.01); *H04N 1/401* (2013.01); *H04N 2201/044* (2013.01)

(56) References Cited

U.S. PATENT DOCUMENTS

| | | | | |
|---|---|---|---|---|
| 5,014,123 | A * | 5/1991 | Imoto | H04N 1/00267 358/506 |
| 8,928,961 | B2 * | 1/2015 | Tanaka | H04N 1/484 358/482 |
| 8,953,232 | B2 * | 2/2015 | Kasugai | H04N 1/1017 358/497 |
| 2002/0126326 | A1 * | 9/2002 | Hashizume | H04N 1/1013 358/509 |
| 2002/0186426 | A1 * | 12/2002 | Sakai | H04N 1/1008 358/505 |
| 2003/0072040 | A1 * | 4/2003 | Okamura | H04N 1/401 358/474 |
| 2004/0114827 | A1 * | 6/2004 | Chizawa | G06T 7/0004 382/274 |
| 2005/0179954 | A1 * | 8/2005 | Arai | H04N 1/00002 358/3.26 |
| 2006/0193013 | A1 * | 8/2006 | Hoshi | H04N 1/00708 358/474 |
| 2008/0055668 | A1 * | 3/2008 | Hirayama | H04N 1/4076 358/461 |
| 2008/0123163 | A1 * | 5/2008 | Nakano | H04N 1/00681 358/498 |
| 2008/0137107 | A1 * | 6/2008 | Futami | H04N 1/121 358/1.4 |
| 2008/0266617 | A1 * | 10/2008 | Suzuki | H04N 1/4076 358/474 |
| 2009/0109500 | A1 * | 4/2009 | Hasegawa | H04N 1/00681 358/474 |
| 2009/0180157 | A1 * | 7/2009 | Shimatani | H04N 1/125 358/474 |
| 2010/0220344 | A1 * | 9/2010 | Tashiro | H04N 1/6086 358/1.13 |
| 2010/0302605 | A1 * | 12/2010 | Suzuki | H04N 1/00002 358/474 |
| 2010/0315687 | A1 * | 12/2010 | Sakane | H04N 1/00002 358/461 |
| 2012/0057210 | A1 * | 3/2012 | Tsukahara | H04N 1/00013 358/461 |
| 2012/0099169 | A1 * | 4/2012 | Hyoki | H04N 1/04 358/518 |
| 2013/0003145 | A1 * | 1/2013 | Osakabe | H04N 1/00572 358/497 |
| 2013/0003147 | A1 * | 1/2013 | Shimatani | G03G 15/602 358/505 |
| 2013/0194638 | A1 * | 8/2013 | Kuno | H04N 1/00087 358/406 |
| 2014/0139895 | A1 * | 5/2014 | Osakabe | H04N 1/00615 358/498 |
| 2014/0355082 | A1 * | 12/2014 | Yoshida | H04N 1/4076 358/493 |
| 2016/0065754 | A1 * | 3/2016 | Kurahashi | H04N 1/00082 358/406 |

FOREIGN PATENT DOCUMENTS

| | | |
|---|---|---|
| JP | 2004109337 A | 4/2004 |
| JP | 2005-159720 A | 6/2005 |
| JP | 2007124110 A | 5/2007 |
| JP | 2013128219 A | 6/2013 |

\* cited by examiner

IMAGE FORMING APPARATUS

INCORPORATION BY REFERENCE

This application claims priority to Japanese Patent Application No. 2014-134615 filed on Jun. 30, 2014, the entire contents of which are incorporated by reference herein.

BACKGROUND

The present disclosure relates to document reading devices configured to convey an original document to a reading unit and read an image of the original document while conveying the original document and relates to image forming apparatuses.

Some document reading devices employ a method in which a pair of reading units are arranged one for each of two sides of an original document to allow parallel reading of both sides of the original document being conveyed. In most of these document reading devices, generally, a CIS (contact image sensor) is used as a reading unit for reading one side of an original document. On the other hand, a CCD (charge coupled device) is often used as a reading unit for reading the other side of the original document. Such a document reading device further includes: a white color reference member disposed facing the reading unit and used to acquire white color reference data; and a contact glass plate interposed between the reading unit and the white color reference member and used in conveying an original document. A document conveyance surface of the contact glass plate on which the original document is to be conveyed comes into contact with the original document to be read by the reading unit. The white color reference data acquired by the reading of the white color reference member by the reading unit is used for shading correction in an image forming apparatus equipped with the document reading device.

SUMMARY

A technique improved over the above technique is proposed herein as one aspect of the present disclosure.

A document reading device according to an aspect of the present disclosure includes a document feed section, a contact glass plate, a white color reference member, a first reading unit, and a positioning member.

An original document is fed on the contact glass plate from the document feed section.

The white color reference member is provided beside a front surface of the contact glass plate.

The first reading unit is provided beside a back surface of the contact glass plate and configured to read through the contact glass plate an image of the original document being in contact with the front surface of the contact glass plate or an image of the white color reference member.

The positioning member is configured to, when the white color reference member is read by the first reading unit, position the white color reference member selectively between a first reading position which is the same position as the original document in contact with the front surface of the contact glass plate and a second reading position which is a position away from the front surface of the contact glass plate in a direction perpendicular to the front surface of the contact glass plate by a document passage clearance provided between the contact glass plate and the white color reference member to allow the original document to pass therethrough.

An image forming apparatus according to another aspect of the present disclosure includes the above-described document reading device, an initial white color reference data storage section, and a shading correction section.

The initial white color reference data storage section is configured to store, as initial white color reference data, white color reference data acquired by the reading of the white color reference member in the first reading position by the first reading unit.

The shading correction section is configured to subject image data acquired by the reading of the original document by the first reading unit to shading correction using a shading correction value obtained using the initial white color reference data.

DETAILED DESCRIPTION

Figure 1:
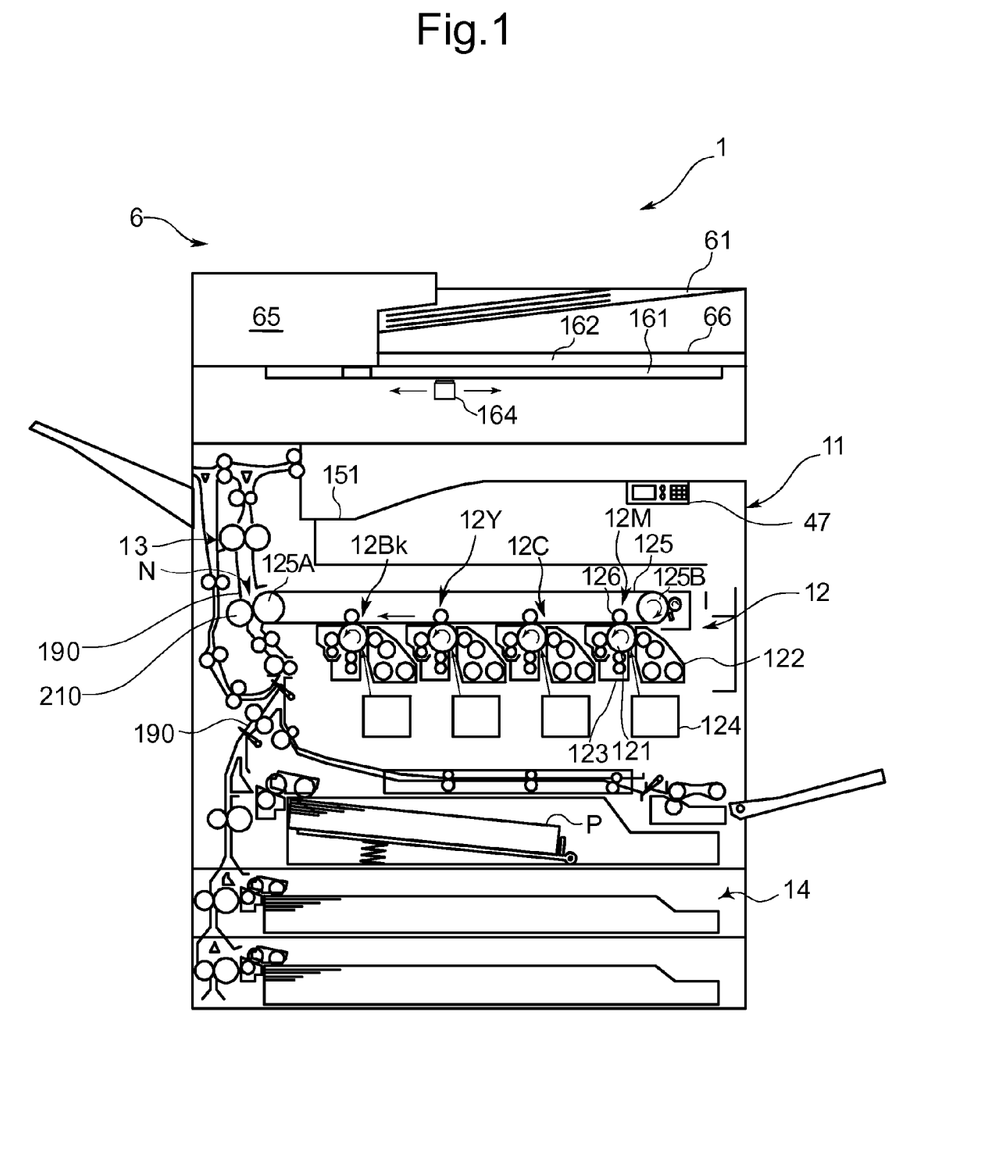
FIG. 1 is a cross-sectional view showing the structure of an image forming apparatus according to a first embodiment of the present disclosure.

Hereinafter, a description will be given of an image forming apparatus according to a first embodiment of the present disclosure with reference to the drawings. FIG. 1 is a cross-sectional view showing the structure of the image forming apparatus according to the first embodiment of the present disclosure.

The image forming apparatus 1 according to the first embodiment of the present disclosure is a multifunction peripheral having multiple functions including, for example, a copy function, a print function, a scan function, and a facsimile function. The image forming apparatus 1 is made up so that an apparatus body 11 thereof includes an image forming section 12, a fixing section 13, a sheet feed section 14, an operating section 47, a document reading device 6, and so on.

Figure 2:
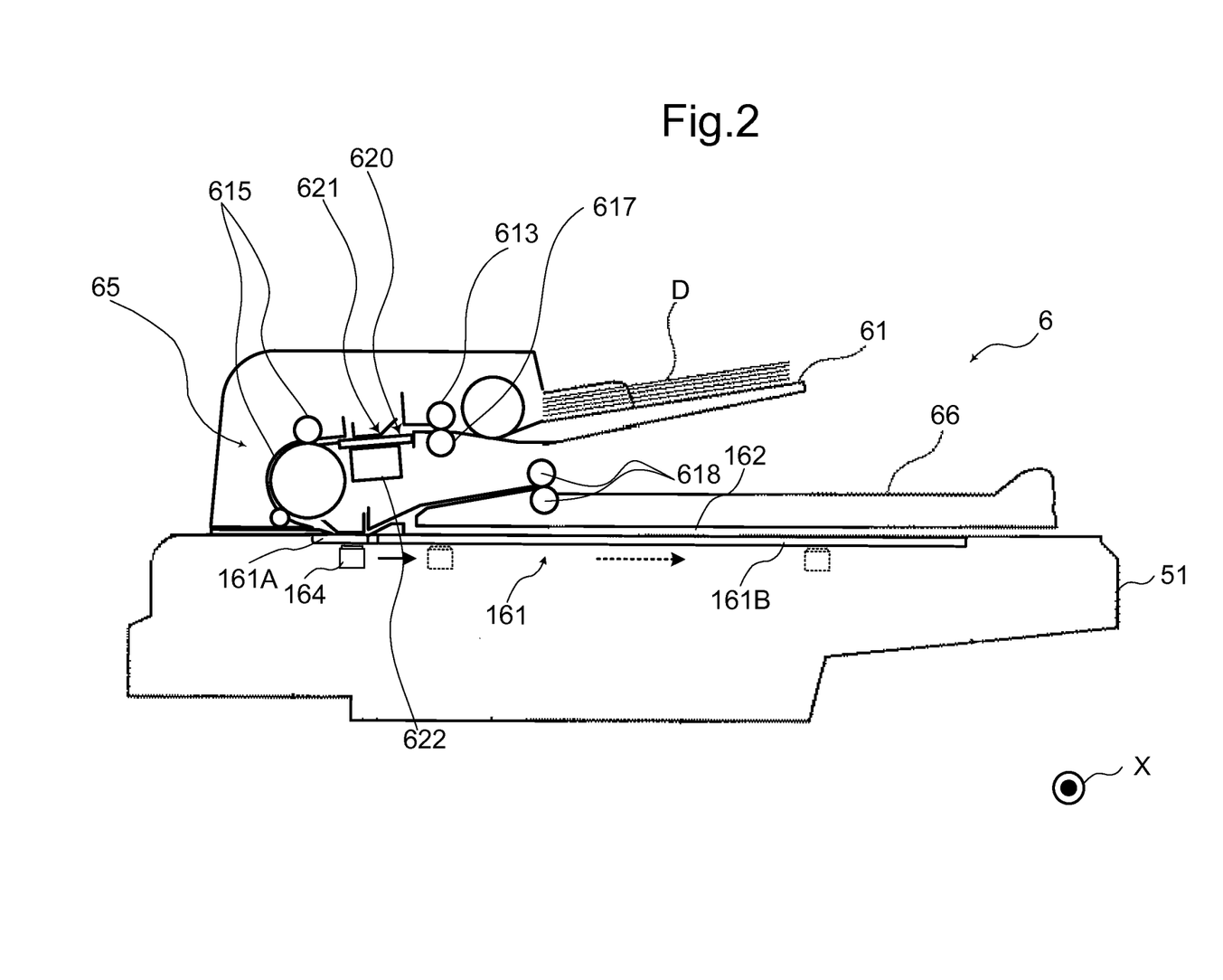
FIG. 2 is a partial cross-sectional view showing the structure of a document reading device according to the first embodiment of the present disclosure.

The image forming apparatus 1 according to this embodiment employs a reading method in which during a single passage of an original document through the document reading device, both sides of the original document are read in parallel. Specifically, a reading unit 164 (see FIG. 2)

provided in the document reading device 6 reads a front side of an original document (one side of the original document as defined in claims), while another reading unit 622 (see FIG. 3) provided in the document reading device 6 reads a back side thereof (the other side of the original document as defined in claims).

The operating section 47 is configured to receive user's commands for various types of operations and processing executable by the image forming apparatus 1, such as a command to execute an image forming operation and a command to execute an image reading operation.

In the image reading operation of the document reading device 6, the document reading device 6 optically reads an image of an original document being conveyed by the document reading device 6 or an image of an original document placed on an original glass plate (platen) 161 to generate image data. The image data generated by the document reading device 6 is stored on an internal HDD, a network-connected computer or the like.

When the image forming apparatus 1 performs the image forming operation, the image forming section 12 forms a toner image on a recording paper sheet P serving as a recording medium fed from the sheet feed section 14, based on image data generated by the image reading operation, image data received from a network-connected computer, image data stored on the internal HDD or other image data. Each of image forming units 12M, 12C, 12Y, and 12Bk of the image forming section 12 includes a photosensitive drum 121, a developing device 122, a toner cartridge (not shown) for holding the toner, a charging device 123, an exposure device 124, and a primary transfer roller 126.

In performing color printing, the image forming unit 12M for magenta, the image forming unit 12C for cyan, the image forming unit 12Y for yellow, and the image forming unit 12Bk for black in the image forming section 12 form respective toner images on their respective photosensitive drums 121 through charging, exposure, and developing processes based on respective images of respective different color components constituting the image data and then allow their respective primary transfer rollers 126 to transfer the toner images to an intermediate transfer belt 125 mounted around a drive roller 125A and a driven roller 125B.

The toner images of different colors transferred to the intermediate transfer belt 125 are superposed each other on the intermediate transfer belt 125 by controlling their transfer timings, resulting in a multicolor toner image. A secondary transfer roller 210 is configured to transfer the multicolor toner image formed on the surface of the intermediate transfer belt 125, at a nip N between the secondary transfer roller 210 and the drive roller 125A with the intermediate transfer belt 125 in between, to a recording paper sheet P conveyed from the sheet feed section 14 along a conveyance path 190. Thereafter, the fixing section 13 fixes the toner image on the paper sheet P by the application of heat and pressure. The paper sheet P having a multicolor image fixed thereon by the completion of the fixation treatment is discharged to a sheet output tray 151.

Figure 3:
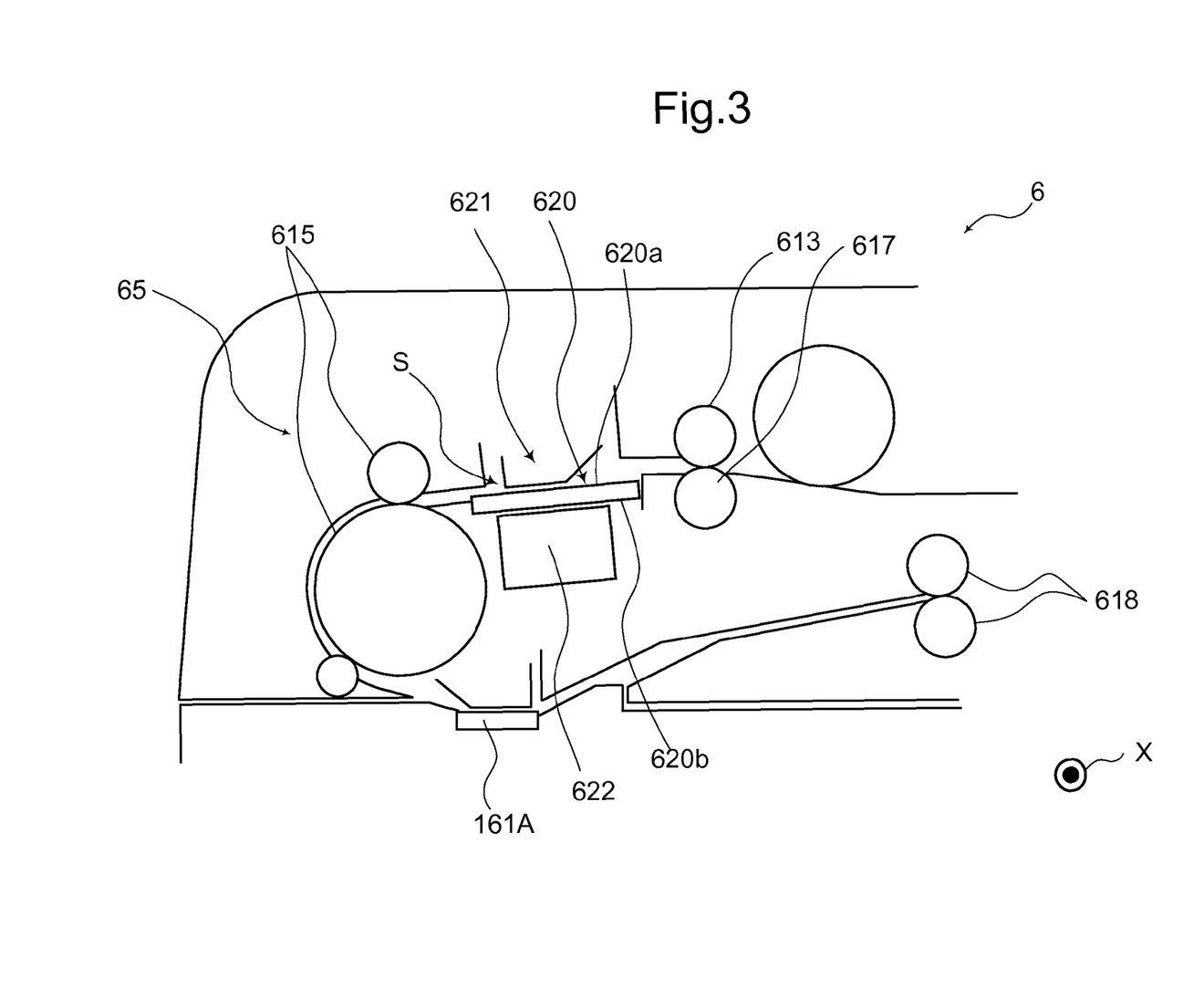
FIG. 3 is another partial cross-sectional view showing the structure of the document reading device according to the first embodiment of the present disclosure.

FIG. 2 is a partial cross-sectional view showing the structure of the document reading device 6 according to the first embodiment of the present disclosure. FIG. 3 is another partial cross-sectional view showing the structure of the document reading device 6 according to the first embodiment of the present disclosure. The direction X indicated by the direction sign in FIGS. 2 and 3 represents a longitudinal direction of a contact glass plate 620 (a main scanning direction of the reading unit 622 to be described hereinafter).

As shown in FIG. 2, the original glass plate 161 comprising a first original glass plate 161A and a second original glass plate 161B is fitted into a top opening in a housing 51 of the document reading device 6. The first original glass plate 161A is an original glass plate for use in reading an original document being conveyed from the document reading device 6. The second original glass plate 161B is an original glass plate for use in reading a stationary original document placed thereon. An openable/closable original cover 162 is provided over the second original glass plate 161B to hold stationary an original document placed on the second original glass plate 161B.

The reading unit 164 is provided movably in the sub-scanning direction beside a surface (back surface) of the original glass plate 161 opposite to a surface (front surface) thereof on which an original document is to be placed. The reading unit 164 contains a CCD reading sensor extending in the main scanning direction. The reading unit 164 is disposed in close contact with the original glass plate 161.

In reading a stationary original document, the reading unit 164 reads the original document placed on the second original glass plate 161B while reciprocating in the sub-scanning direction. On the other hand, in reading an original document being conveyed, the reading unit 164 is fixed at a predetermined position on the back side of the first original glass plate 161A and, in this state, reads the front side of the original document being conveyed to the first original glass plate 161A by the document reading device 6. The reading unit 164 is an example of a second reading unit as defined in claims.

As shown in FIG. 2, the document reading device 6 includes a document loading chute 61 on which to-be-read original documents are to be placed, a document ejection portion 66 to which already read original documents are to be ejected, and a document conveyance mechanism 65. As shown in FIGS. 2 and 3, the document conveyance mechanism 65 is provided with a sheet feed roller 613, a conveyance roller pair 615, a separation roller 617, a sheet ejection roller pair 618, a contact glass plate 620, a white color reference member 621, a reading unit 622, and a positioning member 623 (see FIG. 4 to be described hereinafter). The document conveyance mechanism 65 includes the sheet feed roller 613, the conveyance roller pair 615, the separation roller 617, the sheet ejection roller pair 618, and a drive source configured to give a drive force to these rollers and is an example of a document feed section as defined in claims.

The document conveyance mechanism 65 is configured to feed forward a plurality of original documents P placed on the document loading chute 61 sheet by sheet by the sheet feed roller 613 and separation roller 617 arranged in pair and convey the fed original document P toward the contact glass plate 620 and along the front surface 620a of the contact glass plate 620. The sheet feed roller 613 and the separation roller 617 convey the original document along the front surface 620a of the contact glass plate 620. The original document conveyed onto the contact glass plate 620 is read by the reading unit 622. The document conveyance mechanism 65 is further configured to convey the one-side read original document toward the first original glass plate 161A by the conveyance roller pair 615. The original document conveyed onto the first original glass plate 161A is read also by the reading unit 164. The document conveyance mechanism 65 is further configured to eject the double-side read original document to the document ejection portion 66 by the sheet ejection roller pair 618.

The white color reference member 621 has a solid white surface and is provided beside the front surface 620a of the contact glass plate 620. The white surface of the white color reference member 621 is read by the reading unit 622, so that white color reference data for shading correction to be described hereinafter is acquired.

The reading unit 622 is provided beside the back surface 620b of the contact glass plate 620 and contains a CIS reading sensor extending in the main scanning direction. The reading unit 622 is an example of a first reading unit as defined in claims. The reading unit 622 is configured to read an image of the back side of an original document in contact with the front surface 620a of the contact glass plate 620 or an image of the white color reference member 621 through the contact glass plate 620 in the main scanning direction. For example, the reading unit 622 applies red, green, and blue light beams of an LED (light emitting diode) to an original document to be read while switching from one colored light beam to another and receives reflected light from the original document on a CMOS (complementary metal oxide semiconductor) image sensor. The CMOS image sensor converts the reflected light into an electrical signal to acquire image data in the main scanning direction. The image data is converted into a digital signal by a control unit 10 to be described hereinafter and then subjected to various image processing, such as shading correction, gamma correction, chromatic aberration correction, MTF (modulation transfer function) correction, and scanner color correction. The details of the control unit 10 will be described hereinafter with reference to FIG. 5.

Figure 4:
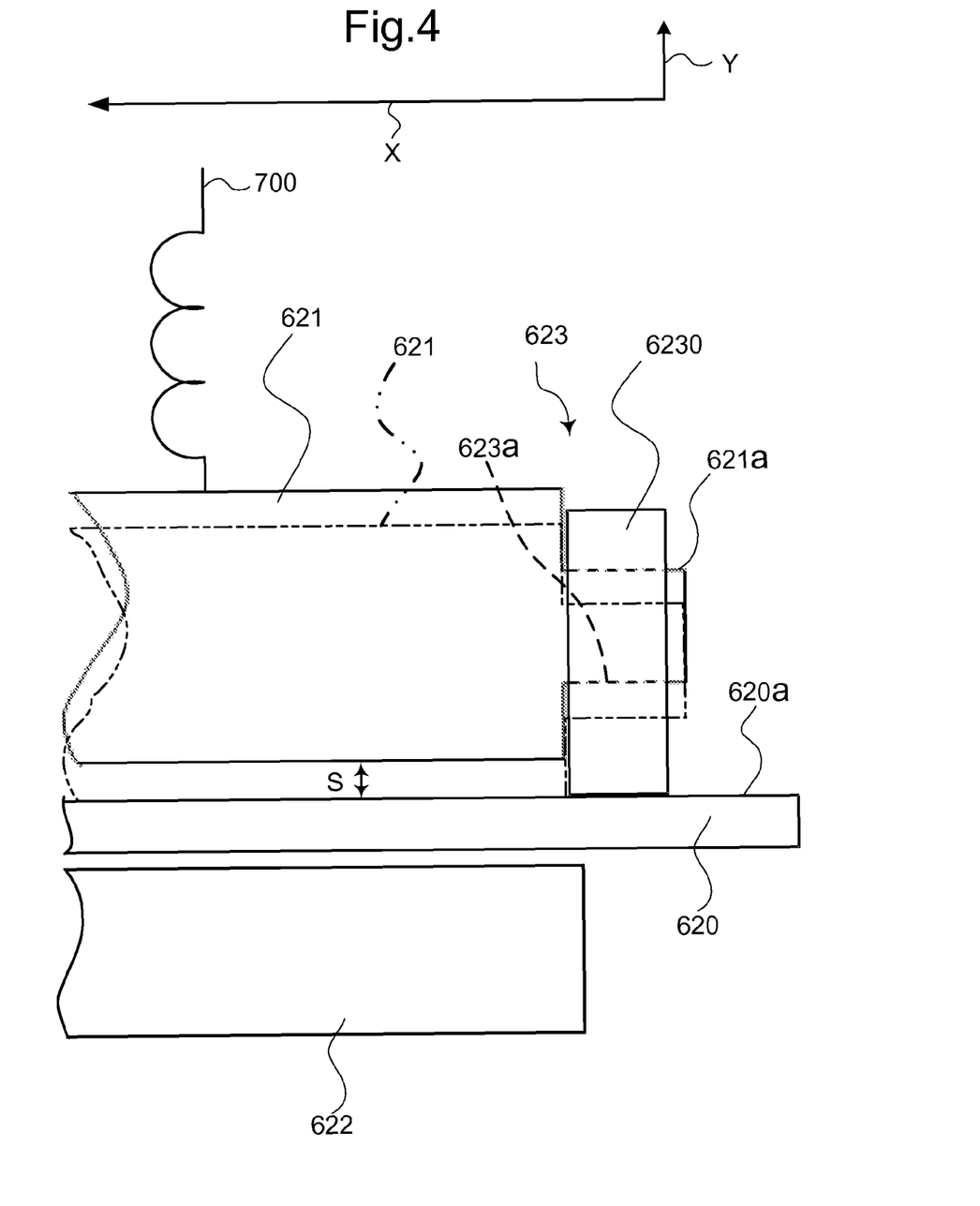
FIG. 4 is a view showing a state where a positioning member positions a white color reference member to a second reading position.

FIG. 4 is a view showing a state where the positioning member 623 positions the white color reference member 621 to a second reading position. The arrow X in FIG. 4 represents the longitudinal direction of the contact glass plate 620 (the main scanning direction of the reading unit 622). The arrow Y in FIG. 4 represents a direction perpendicular to the front surface 620a of the contact glass plate 620. The positioning member 623 is configured to determine the position of the white color reference member 621 in which the reading unit 622 reads the white color reference member 621 selectively to either a first reading position (the position indicated by the dash-double-dot line in FIG. 4) or a second reading position (the position indicated by the solid line in FIG. 4).

The first reading position is a position where the bottom of the white color reference member 621 is in close contact with the front surface 620a of the contact glass plate 620, in which the height of the bottom in the direction perpendicular to the front surface 620a is equal to that of the original document being conveyed in contact with the front surface 620a.

The second reading position is a position where a document passage clearance (S in FIG. 3) allowing an original document to pass therethrough is formed between the contact glass plate 620 and the white color reference member 621 and the white color reference member 621 is kept away from the front surface 620a of the contact glass plate 620 in the direction perpendicular to the front surface 620a. The document passage clearance S is preferably set at, for example, about 3 mm in view of a space required to convey an original document onto the front surface 620a and the depth of field of the reading unit 622.

As shown in FIG. 4, the white color reference member 621 extends in the longitudinal direction (X direction) of the contact glass plate 620 extending in the main scanning direction of the reading unit 622 and is provided at both longitudinal ends with projections 621a extending in the longitudinal direction. The dash-double-dot line in FIG. 4 represents the contour of the white color reference member 621 positioned in the first reading position. The white color reference member 621 in this position is pressed against the front surface 620a of the contact glass plate 620 in the direction (Y direction) perpendicular to the front surface 620a by a resilient member 700, such as a compression spring, and thus positioned in close contact with the front surface 620a.

As shown in FIG. 4, the positioning member 623 is composed of a pair of holding members 6230 capable of being disposed at respective positions facing both the respective longitudinal ends of the white color reference member 621. The holding members 6230 are members not fixed to the interior of the document reading device 6 and thus independent of the document reading device 6. Each holding member 6230 has a hole 623a formed facing the projection 621a and capable of receiving the projection 621a. The projections 621a of the white color reference member 621 can be fitted into the respective holes 623a in the pair of holding members 6230, so that the positioning member 623 positions the white color reference member 621, against the pressing force of the resilient member 700, in a position the document passage clearance S away from the front surface 620a of the contact glass plate 620 in the direction (Y direction) perpendicular to the front surface 620a, i.e., the second reading position. The white color reference member 621 indicated by the solid line in FIG. 4 is in a state where it is positioned in the second reading position.

For example, an operator manually moves the white color reference member 621, which is brought into close contact with the contact glass plate 620 and put in the first reading position by the pressing of the resilient member 700, away from the contact glass plate 620 against the pressure of the resilient member 700 to the position indicated by the solid line shown in FIG. 4 and, in this state, disposes the holding members 6230 at the positions facing the projections 621a. Then, the operator holds the white color reference member 621 so that the projections 621a and the holes 623a in the holding members 6230 are at the same height and, in this state, fits the holes 623a onto the projections 621a. In other words, the projections 621a are fitted into the holes 623a. Thus, the positioning member 623 can position the white color reference member 621 in the second reading position. At this time, the positioning member 623 is mounted to the document reading device 6 by the pressing of the resilient member 700 toward the front surface of the contact glass plate 620.

In this embodiment, in a reading operation of the reading unit 622 for reading the white color reference member 621 in the first reading position, the positioning member 623 positions the white color reference member 621 in the first reading position. In a reading operation of the reading unit 622 for reading an original document, the positioning member 623 positions the white color reference member 621 in the second reading position.

Figure 5:
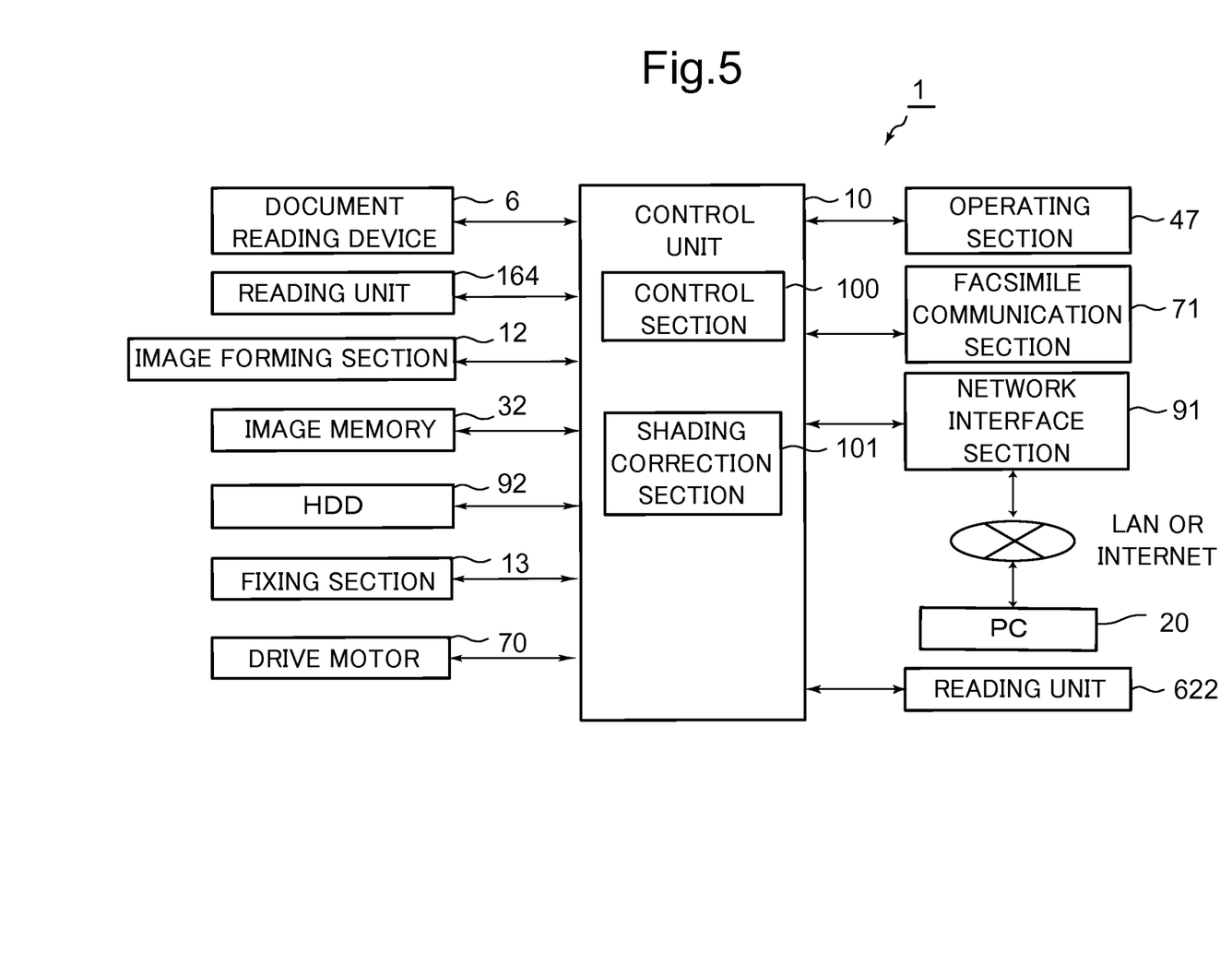
FIG. 5 is a functional block diagram showing an essential internal configuration of the image forming apparatus according to the first embodiment of the present disclosure.

FIG. 5 is a functional block diagram showing an essential internal configuration of the image forming apparatus 1. The image forming apparatus 1 includes the control unit 10, the document reading device 6, the operating section 47, the reading unit 164, the reading unit 622, an image memory 32, the image forming section 12, the fixing section 13, a drive motor 70, a facsimile communication section 71, a network interface section 91, an HDD 92, and so on.

The image memory 32 provides a region for temporarily storing data of the document image acquired by reading by the reading unit 164 or the reading unit 622 and for temporarily saving data to be printed by the image forming section 12. The image memory 32 is an example of an initial white color reference data storage section as defined in claims.

The facsimile communication section 71 includes a coding/decoding section, a modulation/demodulation section, and an NCU (network control unit), all of which are not illustrated, and is configured to perform facsimile communication using a public telephone network.

The network interface section 91 is constituted by a communication module, such as a LAN board, and configured to transfer various data to and from computers 20 and the like in a local area via a LAN or on the Internet connected to the network interface section 91.

The HDD 92 is a large storage device capable of storing the document image read by the reading unit 164 or the reading unit 622 or like image.

The drive motor 70 is a drive source for applying a rotary drive force to various rotary members of the image forming section 12, the conveyance roller pair, and other rotary members.

The control unit 10 is composed of a CPU (central processing unit), a RAM, a ROM, a dedicated hardware circuit, and so on and governs the overall operation control of the image forming apparatus 1. The control unit 10 includes a control section 100 and a shading correction section 101.

The control section 100 is connected to the document reading device 6, the operating section 47, the reading unit 164, the reading unit 622, the image memory 32, the image forming section 12, the fixing section 13, the drive motor 70, the facsimile communication section 71, the network interface section 91, the HDD 92, and so on, and controls the operations of these components.

The shading correction section 101 is configured to subject image data acquired by the reading of an original document by the reading unit 622 to shading correction using a shading correction value obtained using initial white color reference data.

The control unit 10 operates according to an image processing program installed on the HDD 92 to function as the control section and the shading correction section 101. Alternatively, each of the control section 100 and the shading correction section 101 may not be implemented by the operation according to the image processing program but may be constituted by a hardware circuit. Hereinafter, the same applies to the other embodiments unless otherwise stated.

Figure 6:
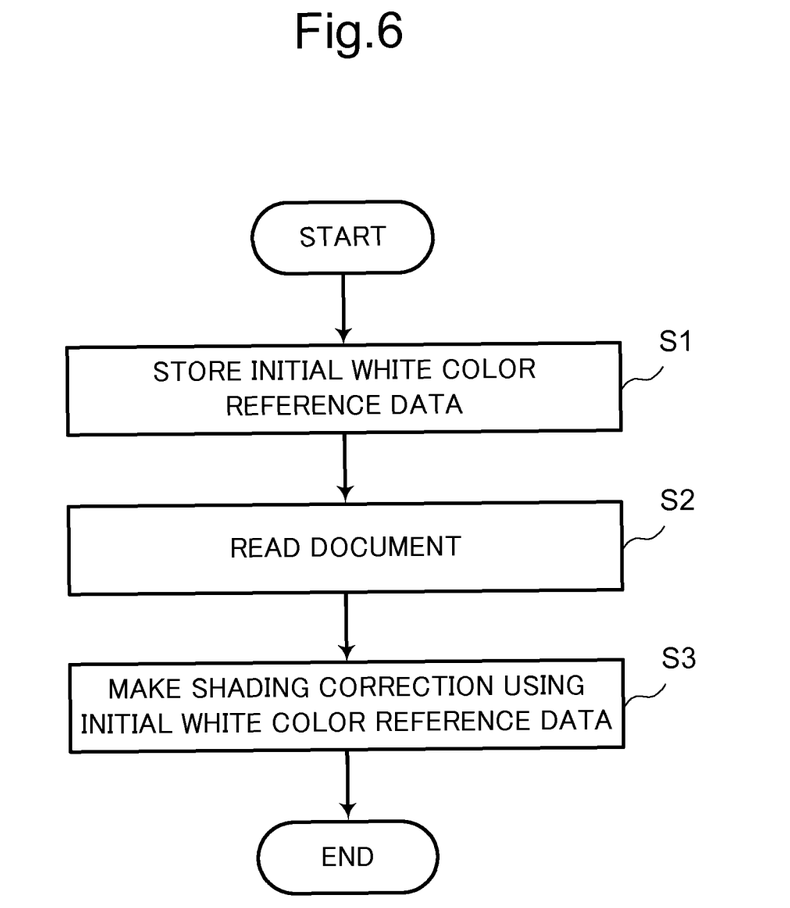
FIG. 6 is a flowchart showing shading correction processing in the image forming apparatus according to the first embodiment of the present disclosure.

Next, a description will be given of shading correction processing in the image forming apparatus 1. FIG. 6 is a flowchart showing shading correction processing in the image forming apparatus 1 according to the first embodiment of the present disclosure.

When the reading unit 622 reads the white color reference member 621 in the first reading position as a prerequisite for the shading correction processing according to the first embodiment, the control section 100 allows the image memory 32 to store, as initial white color reference data, white color reference data acquired by the reading operation of the reading unit 622.

At this time, the positioning member 623 has already completed the positioning of the white color reference member 621 to the first reading position. The control section 100 allows the reading unit 622 to read the white color reference member 621 in the first reading position, i.e., the white color reference member 621 in close contact with the front surface 620a of the contact glass plate 620. The control section 100 allows the image memory 32 to store the initial white color reference data acquired by the reading operation of the reading unit 622 (S1). Thereafter, the operator uses the positioning member 623 to position the white color reference member 621 in the second reading position. After the completion of the positioning into the second reading position, the document reading device 6 and the image forming apparatus 1 become ready for a normal operation.

The control section 100 allows the reading unit 622 to read an original document being conveyed on the front surface 620a of the contact glass plate 620 (S2).

The shading correction section 101 makes shading correction to each of document images acquired for each main scanning line by the reading of the original document by the reading unit 622, using the initial white color reference data stored in the image memory 32 without making any alteration thereto (S3).

Upon completion of shading correction to all the document images acquired for each main scanning line by the reading of the original document by the reading unit 622, the shading correction processing ends.

In the first embodiment, the positioning member 623 can position the white color reference member 621 to be read by the reading unit 622 into both the two positions, i.e., the first reading position which is the same position as the original document in contact with the front surface of the contact glass plate 620 and the second reading position spaced away from the front surface 620a of the contact glass plate 620 in the direction perpendicular to the front surface 620a by the document passage clearance S allowing passage of the original document between the contact glass plate 620 and the white color reference member 621. In short, the positioning member 623 can position the white color reference member 621 selectively in either the first reading position or the second reading position.

Furthermore, by the reading of the white color reference member 621 in the first reading position by the reading unit 622, white color reference data acquired by reading the white color reference member 621 in the same environment as during reading of an original document can be acquired as initial white color reference data for use in shading correction. In other words, the first embodiment enables the acquisition of initial white color reference data that can provide more excellent shading correction to image data acquired by the reading operation of the reading unit 622.

Moreover, in the first embodiment, since after the acquisition of the initial white color reference data white color reference data for shading correction can be acquired by the reading of the white color reference member 621 in the second reading position by the reading unit 622, a document passage clearance enough to allow the passage of an original document can be ensured between the contact glass plate 620 and the white color reference member 621.

In a general double-sided document reading device different from this embodiment, a CIS is fixedly mounted in close contact to a contact glass plate. A white color reference member is disposed at a position facing the CIS on the opposite surface of the contact glass plate to the surface thereof to which the CIS is mounted. An original document needs to be passed between the surface of the contact glass plate and the white color reference member in order to allow the CIS to read the original document through the contact glass plate. For this reason, a clearance capable of passing the original document must be formed between the contact glass plate and the white color reference member. Therefore, in acquiring white color reference data for use in shading correction, the reading unit reads the white color reference member with the clearance in between.

In reading an original document, the above CIS reading unit reads the original document being conveyed in close contact with the contact glass plate. On the other hand, in acquiring white color reference data, the reading unit reads the white color reference member located away from the surface of the contact glass plate. When like this there is a difference in distance from the reading unit between the case where the object to be read is the original document and the case where the object to be read is the white color reference member, even if the white color reference data acquired by reading the white color reference member under these circumstances is used for correction of image data acquired by reading the original document, striped concentration variations may occur in the entire image of the original document to fail to maintain a uniform concentration of the image of the original document.

In contrast, in the first embodiment, initial white color reference data acquired by reading the white color reference member 621 in the same environment as a to-be-read original document in terms of the relation with the contact glass plate 620 is used for shading correction. Therefore, the possibility of occurrence of concentration variations in the image acquired by the reading operation of the reading unit 622 can be reduced, so that the concentration of the image acquired by the reading operation of the reading unit 622 can be maintained uniformly.

Therefore, the first embodiment enables the acquisition of white color reference data for shading correction that can provide more excellent shading correction to image data acquired by the reading operation of the reading unit 622.

Figure 7:
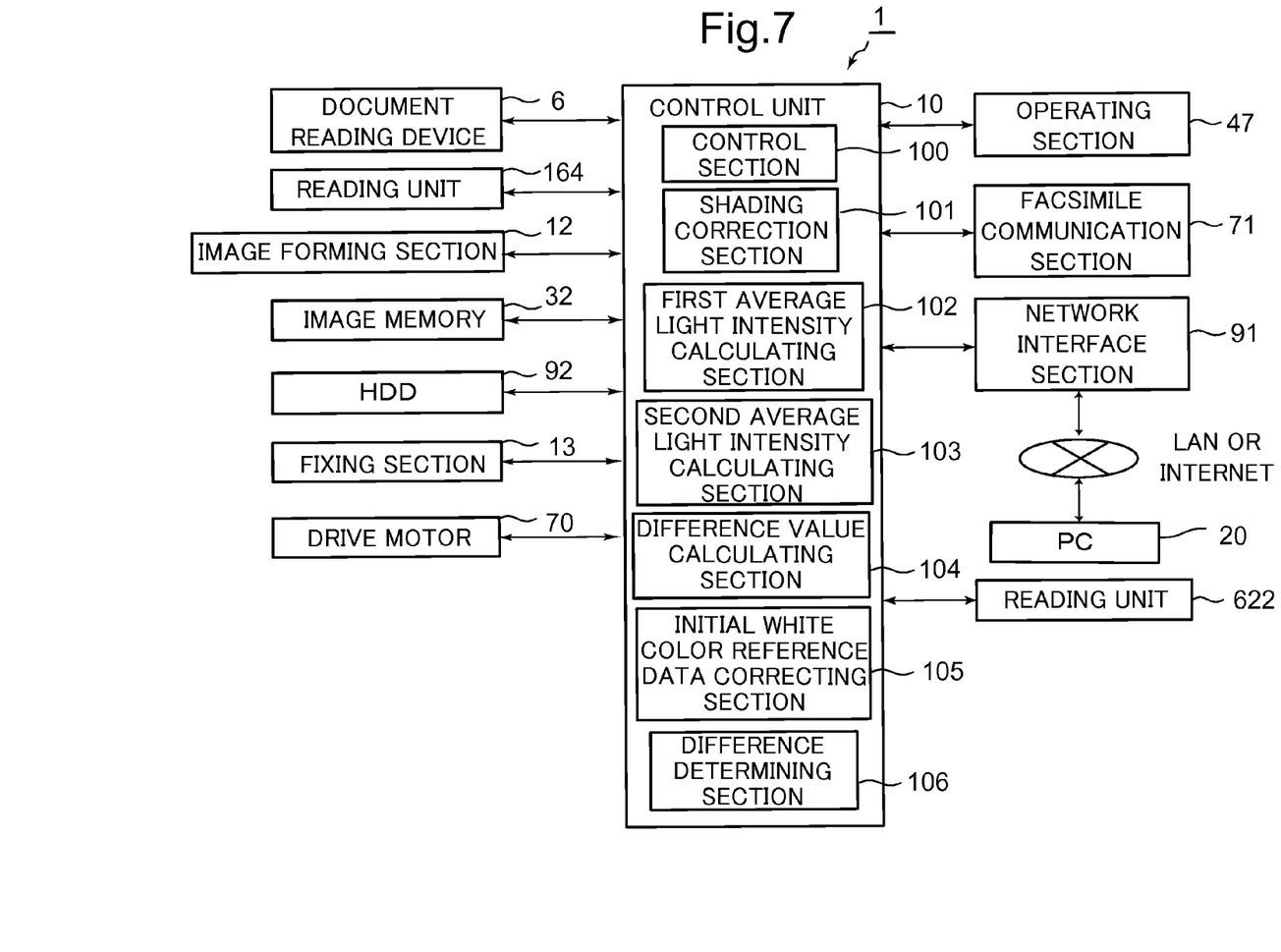
FIG. 7 is a functional block diagram showing an essential internal configuration of an image forming apparatus according to a second embodiment of the present disclosure.

Next, a description will be given of an image forming apparatus according to a second embodiment of the present disclosure with reference to the drawings. FIG. 7 is a functional block diagram showing an essential internal configuration of the image forming apparatus 1 according to the second embodiment of the present disclosure. Further description will be omitted of the same elements as those of the image forming apparatus 1 described in the first embodiment.

A control unit 10 includes a control section 100, a shading correction section 101, a first average light intensity calculating section 102, a second average light intensity calculating section 103, a difference value calculating section 104, an initial white color reference data correcting section 105, and a difference determining section 106.

The first average light intensity calculating section 102 is configured to calculate, with respect to the initial white color reference data, an average value of light intensities (lightness values) at a plurality of locations in the entire region of the main scanning direction.

The second average light intensity calculating section 103 is configured to calculate an average value of light intensities (lightness values) at a plurality of locations in the entire region of the white color reference member 621 in the main scanning direction, acquired by the reading of the white color reference member 621 in the second reading position by the reading unit 622.

The difference value calculating section 104 is configured to calculate a difference value between the average value calculated by the first average light intensity calculating section 102 and the average value calculated by the second average light intensity calculating section 103. The difference value used herein refers to a light intensity difference produced owing to the fact that the first and second reading positions differ by the document passage clearance S in distance from the light source (the LED of the reading unit 622), i.e., owing to the difference S in distance from the light source.

The initial white color reference data correcting section 105 is configured to correct the initial white color reference data by integrating the difference value calculated by the difference value calculating section 104 into each of the light intensities (lightness values) at the plurality of locations in the entire region of the main scanning direction contained in the initial white color reference data.

The difference determining section 106 is configured to determine whether or not the difference value calculated by the difference value calculating section 104 exceeds a predetermined reference difference value.

When the difference determining section 106 determines that the difference value exceeds the reference difference value, the initial white color reference data correcting section 105 corrects the initial white color reference data according to the difference value.

The shading correction section 101 is configured to subject a document image acquired by the reading of an original document by the reading unit 622 to shading correction using a shading correction value obtained based on the initial white color reference data corrected by the initial white color reference data correcting section 105 and the white color reference data acquired by the reading of the white color reference member 621 in the second reading position by the reading unit 622.

Figure 8:
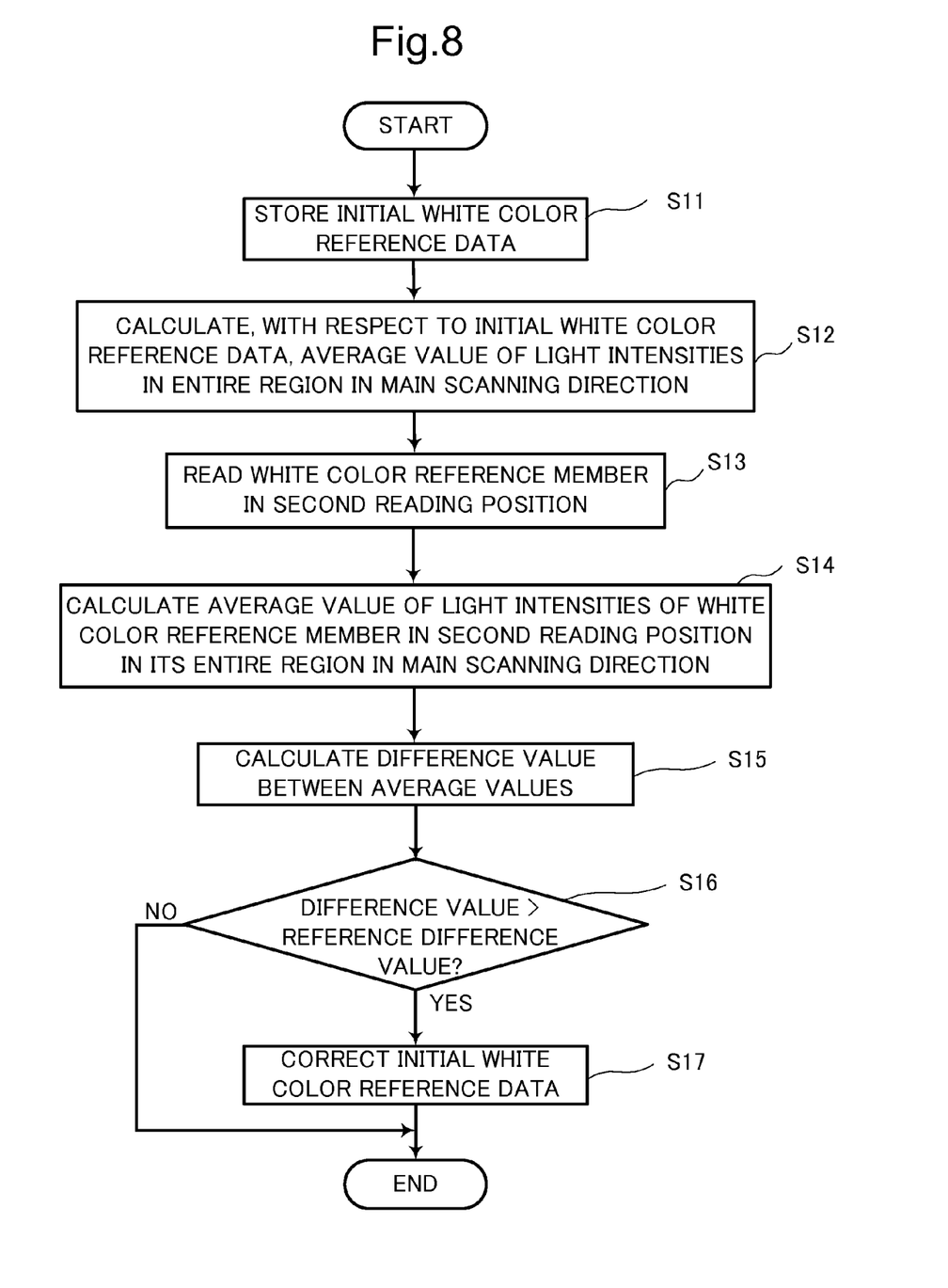
FIG. 8 is a flowchart showing shading correction processing in the image forming apparatus according to the second embodiment of the present disclosure.

Next, a description will be given of shading correction processing in the image forming apparatus 1. FIG. 8 is a flowchart showing shading correction processing in the image forming apparatus 1 according to the second embodiment of the present disclosure. Further description will be omitted of the same processing steps as those in the first embodiment.

In the second embodiment, like the first embodiment, the initial white color reference data has been previously acquired and stored in the image memory 32 (S11). Furthermore, the operator has already completed the positioning of the white color reference member 621 into the second reading position using the positioning member 623.

Then, the first average light intensity calculating section 102 calculates, with respect to the initial white color reference data, an average value of light intensities (lightness values) at a plurality of locations in the entire region of the main scanning direction (S12).

The reading unit 622 reads the white color reference member 621 positioned in the second reading position (S13). The second average light intensity calculating section 103 calculates an average value of light intensities (lightness values) at a plurality of locations in the entire region of the white color reference member 621 in the main scanning direction, contained in the white color reference data acquired by the reading of the white color reference member in S13 (S14). Subsequently, the difference value calculating section 104 calculates a difference value between the average value calculated by the first average light intensity calculating section 102 in S12 and the average value calculated by the second average light intensity calculating section 103 in S14 (S15).

The difference determining section 106 determines whether or not the above difference value exceeds the predetermined reference difference value (S16). When the difference value has been determined to exceed the reference difference value (YES in S16), the initial white color reference data correcting section 105 corrects the initial white color reference data stored in the image memory 32 at this point in time according to the difference value (S17). Subsequently, the shading correction section 101 makes shading correction using the above corrected initial white color reference data in the same manner as in the first embodiment.

On the other hand, when in S16 the difference determining section 106 has determined that the difference value does not exceed the reference difference value (NO in S16), the processing ends. In other words, the initial white color reference data is not corrected.

Because the initial white color reference data is data acquired when the light source is at an early stage of operation or lights up at a particular temperature, it is influenced, with the progress of the operation of the actual device, by intensity variations of the illumination due to long-time operation or intensity variations due to changes in surrounding temperature. However, in the second embodiment, since the initial white color reference data is corrected by the difference value between the average value calculated by the first average light intensity calculating section 102 and the average value calculated by the second average light intensity calculating section 103, the influence due to intensity variations can be reduced. The white color reference member 621 is read in the first reading position only at the time of acquisition of initial white color reference data and thereafter kept positioned in the second reading position. Therefore, correction because of intensity variations is made using the white color reference member 621 positioned in the second reading position.

Although in the second embodiment the initial white color reference data is corrected according to the difference value depending upon the determination in S16 of whether or not the difference value exceeds the reference difference value, the present disclosure is not limited to this. For example, the initial white color reference data may be corrected according to the difference value regardless of whether or not the difference value exceeds the reference difference value.

Although in the second embodiment the initial white color reference data correcting section 105 corrects the initial white color reference data by integrating the difference value calculated by the difference value calculating section 104 into each of the light intensities (lightness values) at a plurality of locations in the entire region of the main scanning direction contained in the initial white color reference data, the present disclosure is not limited to this. For example, the initial white color reference data correcting section 105 may correct the initial white color reference data by adjusting the lightness of the entire region of the main scanning direction by increasing or decreasing the light intensities (lightness values) at the plurality of locations in the entire region of the main scanning direction by the difference value calculated by the difference value calculating section 104.

Figure 9:
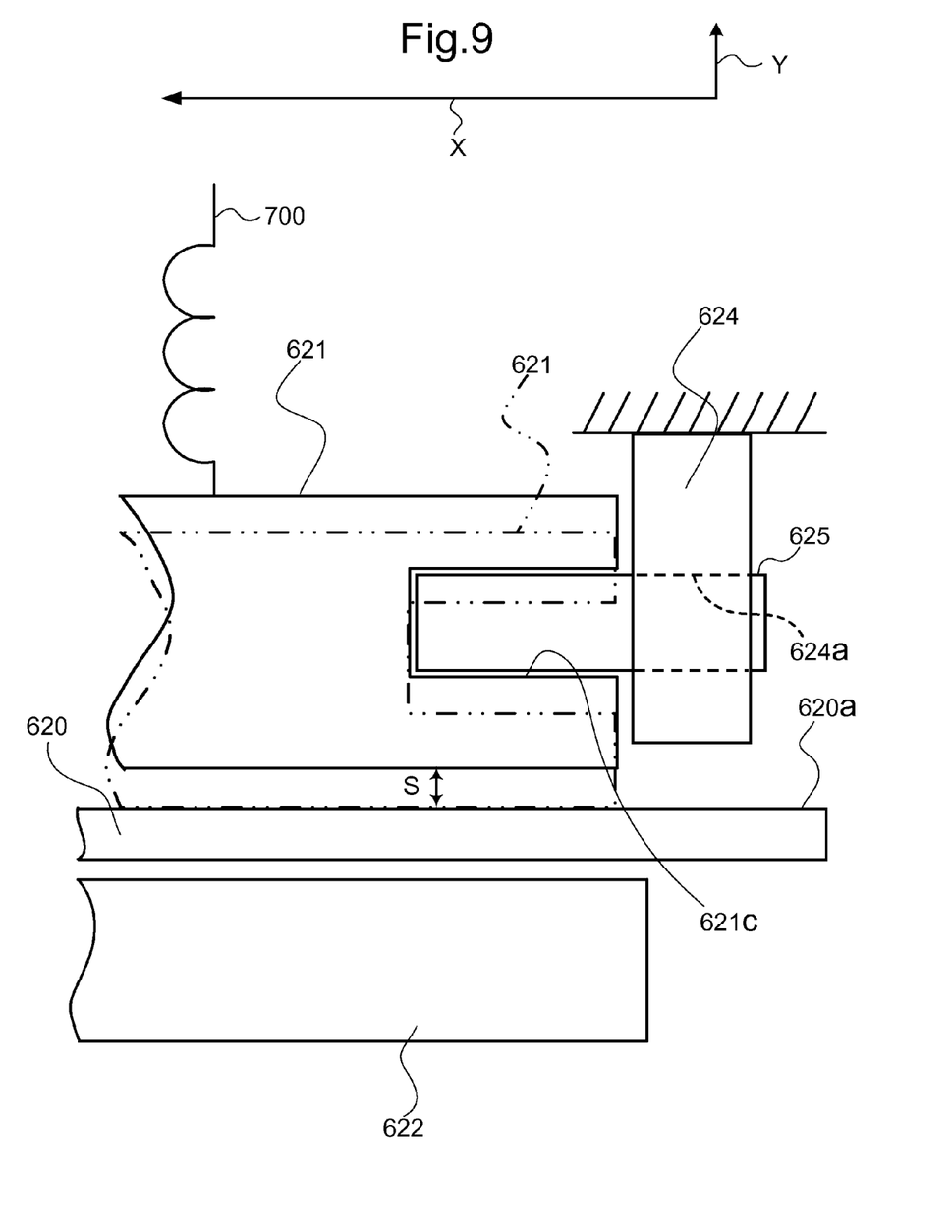
FIG. 9 is a view showing a state where a positioning member positions a white color reference member to a second reading position.

The present disclosure is not limited to the above embodiments and can be modified in various ways. For example, although the above descriptions have been made of the positioning of the white color reference member 621 using the above positioning member 623, the present disclosure is not limited to this. FIG. 9 is a view showing a state where a positioning member according to another embodiment positions a white color reference member in the second reading position. The arrow X in FIG. 9 represents the longitudinal direction of the contact glass plate 620 (the main scanning direction of the reading unit 622). The arrow Y in FIG. 9 represents a direction perpendicular to the front surface 620a of the contact glass plate 620. Further description will be omitted of the same configurations as those in the first embodiment described with reference to FIG. 4 and so on.

As shown in FIG. 9, a white color reference member 621 extends in the longitudinal direction (X direction) of the contact glass plate 620 extending in the main scanning direction of the first reading unit 622 and is provided at both longitudinal ends with recesses 621c. The dash-double-dot line in FIG. 9 represents the white color reference member 621 positioned in the first reading position. As shown in the figure, the white color reference member 621 in the first reading position is pressed against the front surface 620a of the contact glass plate 620 in the direction (Y direction) perpendicular to the front surface 620a by a resilient member 700, such as a compression spring, and thus positioned in close contact with the front surface 620a.

A positioning member 624 is constituted as a pair of members attached to portions of the document reading device 6 and, as shown in FIG. 9, provided at respective positions facing both the respective longitudinal ends of the white color reference member 621. The pair of positioning members 624 are fixed at their tops to the interior of the document reading device 6.

The pair of positioning members 624 are provided with respective holes 624a formed at a predetermined height from the front surface 620a of the contact glass plate 620 to extend in the direction (Y direction) perpendicular to the front surface 620a. In other words, the pair of positioning members 624 are provided with respective holes 624a formed at respective positions facing both the respective longitudinal ends of the white color reference member 621 and penetrating the positioning members 624 in the longitudinal direction of the white color reference member 621.

Each of the pair of positioning members 624 includes a holding member 625 capable of passing through the hole 624a and being inserted into the recess 621c in the white color reference member 621. When each holding member 625 is inserted into the hole 624a of one of the paired positioning members 624 and the recess 621c in the white color reference member 621, the positioning members 624 position the white color reference member 621 in a position where the recesses 621c are at a height where they are opposed to the holes 624a in the positioning member 624 (i.e., the second reading position) against the pressing force of the resilient member 700 toward the front surface 620a. The solid line in FIG. 9 represents the contour of the white color reference member 621 positioned in the second reading position.

In this manner, an operator can use the positioning members 624 to position the white color reference member 621 in the second reading position by manually moving the white color reference member 621, which has been positioned in the first reading position in close contact with the contact glass plate 620 by the pressing of the resilient member 700, to the position where the holes 624a in the positioning members 624 are at the same height as the recesses 621c in the white color reference member 621 and inserting the holding members 625 through the holes 624a and then into the recesses 621c.

The structures, configurations, and processing shown in the above embodiments with reference to FIGS. 1 to 9 are merely illustrative of the present disclosure and the present disclosure is not intended to be limited to the above structures, configurations, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a document reading device comprising:
   a document feed section;
   a contact glass plate on which an original document is to be fed from the document feed section;
   a white color reference member provided beside a front surface of the contact glass plate;
   a first reading unit having a CIS reading sensor, the first reading unit being provided beside a back surface of the contact glass plate and being configured to read through the contact glass plate an image of the original document being in contact with the front surface of the contact glass plate or an image of the white color reference member; and
   a positioning member being disposed at respective positions facing both respective longitudinal ends of the white color reference member, and including a pair of holding members capable of holding the longitudinal ends of the white color reference member, the positioning member being configured to, when the white color reference member is read by the first reading unit, position the white color reference member selectively between the first reading position and the second reading position by: in a state where the pair of holding members is not having the longitudinal ends of the white color reference member, when the white color reference member is read by the first reading unit, positioning the white color reference member to the first reading position which is a same position as the original document in contact with the front surface of the contact glass plate; and in a state where the pair of holding members is having the longitudinal ends of the white color reference member, when the white color reference member is read by the first reading unit, positioning the white color reference member to the second reading position which is a position away from the front surface of the contact glass plate in a direction perpendicular to the front surface of the contact glass plate by a document passage clearance provided between the contact glass plate and the white color reference member to allow the original document to pass therethrough;
an initial white color reference data storage section configured to store, as initial white color reference data, white color reference data acquired by the reading of the white color reference member in the first reading position by the first reading unit; and
a shading correction section configured to subject image data acquired by the reading of the original document by the first reading unit to shading correction using a shading correction value obtained using the initial white color reference data,
wherein the first reading unit is further configured to, with the positioning member positioning the white color reference member in the second reading position, read reflected light for shading correction from the white color reference member in the second reading position and acquire light intensities of the reflected light at a plurality of locations in an entire region of the white color reference member in a main scanning direction,
the image forming apparatus further comprises:
a first average light intensity calculating section configured to calculate, with respect to the initial white color reference data, an average value of light intensities at a plurality of locations in the entire region of the main scanning direction;
a second average light intensity calculating section configured to calculate an average value of the light intensities at the plurality of locations in the entire region of the white color reference member in the main scanning direction, acquired by the reading of the white color reference member in the second reading position by the first reading unit;
a difference value calculating section configured to calculate a difference value between the average value calculated by the first average light intensity calculating section and the average value calculated by the second average light intensity calculating section; and
an initial white color reference data correcting section configured to correct the initial white color reference data for the light intensities at the plurality of locations in the entire region of the main scanning direction according to the difference value calculated by the difference value calculating section, and
the shading correction section is further configured to make the shading correction using a shading correction value obtained using the initial white color reference data corrected by the initial white color reference data correcting section and the image data acquired by the reading of the original document in the first reading position by the first reading unit.

2. The image forming apparatus according to claim 1, wherein
when the first reading unit reads the white color reference member in the first reading position, the white color reference member is positioned in the first reading position by the positioning member, and
when the first reading unit reads the original document fed from the document feed section, the white color reference member is positioned in the second reading position by the positioning member.

3. The image forming apparatus according to claim 1, wherein when positioning the white color reference member in the first reading position, the positioning member brings a reading surface of the white color reference member into close contact with the front surface of the contact glass plate.

4. The image forming apparatus according to claim 1, wherein the document feed section is configured to feed the original document onto the contact glass plate along the front surface of the contact glass plate, with the positioning member positioning the white color reference member in the second reading position.

5. The image forming apparatus according to claim 1, further comprising a second reading unit having a CCD reading sensor and configured to read one side of the original document fed from the document feed section, wherein
the first reading unit and the second reading unit are configured to read in parallel both sides of the original document fed from the document feed section.

6. The image forming apparatus according to claim 1, further comprising a difference determining section configured to determine whether or not the difference value calculated by the difference value calculating section exceeds a predetermined reference difference value,
wherein when the difference determining section determines that the difference value exceeds the reference difference value, the initial white color reference data correcting section corrects the initial white color reference data by the reference value.

7. An image forming apparatus comprising:
a document reading device comprising:
a document feed section;
a contact glass plate on which an original document is to be fed from the document feed section;
a white color reference member provided beside a front surface of the contact glass plate;
the first reading unit having a CIS reading sensor, the first reading unit being provided beside a back surface of the contact glass plate and being configured to read through the contact glass plate an image of the original document being in contact with the front surface of the contact glass plate or an image of the white color reference member; and
the positioning member is further configured to, when the projections of the white color reference member are fitted into the holes in the pair of holding members, position the white color reference member in the second reading position located the document passage clearance away from the front surface of the contact glass plate in the direction perpendicular to the front surface of the contact glass plate against a pressing force of the resilient member;
an initial white color reference data storage section configured to store, as initial white color reference data, white color reference data acquired by the reading of the white color reference member in the first reading position by the first reading unit; and
a shading correction section configured to subject image data acquired by the reading of the original document by the first reading unit to shading correction using a shading correction value obtained using the initial white color reference data,
wherein the white color reference member extends in a longitudinal direction of the contact glass plate extending in the main scanning direction of the first reading unit, includes projections provided at both longitudinal ends thereof, is pressed toward the front surface of the contact glass plate by a resilient member, and is positioned in the first reading position in close contact with the front surface of the contact glass plate by the positioning member,
the positioning member includes a pair of holding members capable of being disposed at respective positions facing both the respective longitudinal ends of the white color reference member,
the holding members include respective holes formed therein facing the respective projections, and
the positioning member is further configured to, when the projections of the white color reference member are fitted into the holes in the pair of holding members, position the white color reference member in the second reading position located the document passage clearance away from the front surface of the contact glass plate in the direction perpendicular to the front surface of the contact glass plate against a pressing force of the resilient member.

8. The image forming apparatus according to claim 7, wherein
the holding members are disposed unfixedly at the respective positions facing both the respective longitudinal ends of the white color reference member, and
while the projections of the white color reference member are fitted into the holes in the pair of holding members and thus the positioning member positions the white color reference member in the second reading position, the positioning member is mounted to the document reading device by the pressing of the resilient member toward the front surface of the contact glass plate.

9. An image forming apparatus comprising:
a document reading device comprising:
a document feed section;
a contact glass plate on which an original document is to be fed from the document feed section;
a white color reference member provided beside a front surface of the contact glass plate;
the first reading unit having a CIS reading sensor, the first reading unit being provided beside a back surface of the contact glass plate and being configured to read through the contact glass plate an image of the original document being in contact with the front surface of the contact glass plate or an image of the white color reference member; and
the positioning member is further configured to, when the projections of the white color reference member are fitted into the holes in the pair of holding members, position the white color reference member in the second reading position located the document passage clearance away from the front surface of the contact glass plate in the direction perpendicular to the front surface of the contact glass plate against a pressing force of the resilient member;
an initial white color reference data storage section configured to store, as initial white color reference data, white color reference data acquired by the reading of the white color reference member in the first reading position by the first reading unit; and
a shading correction section configured to subject image data acquired by the reading of the original document by the first reading unit to shading correction using a shading correction value obtained using the initial white color reference data,
wherein the white color reference member extends in a longitudinal direction of the contact glass plate extending in the main scanning direction of the first reading unit, includes recesses provided at both longitudinal ends thereof, is pressed in the direction perpendicular to the front surface of the contact glass plate by a resilient member, and positioned in the first reading position in close contact with the front surface of the contact glass plate by the positioning member,
the positioning member is constituted as a pair of members attached to portions of the document reading device and provided at respective positions facing both the respective longitudinal ends of the white color reference member, the pair of members including respective holes formed a predetermined height away from the front surface of the contact glass plate in the direction perpendicular to the front surface of the contact glass plate,
the positioning member further includes a pair of holding members capable of being disposed at respective positions facing both the respective longitudinal ends of the white color reference member, the pair of holding members being insertable through the respective holes into the recesses in the white color reference member, and
when the white color reference member is moved against a pressing force of the resilient member until the recesses reach a height where the recesses are opposed to the holes in the positioning member and, in this state, the holding members are inserted through the holes in the positioning member into the recesses in the white color reference member, the white color reference member is positioned in the second reading position.

* * * * *